US008634451B1

(12) United States Patent
Narasimhan et al.

(10) Patent No.: US 8,634,451 B1
(45) Date of Patent: *Jan. 21, 2014

(54) MIMO-OFDM RECEIVER PROCESSING

(71) Applicant: Marvell International Ltd., Hamilton (BM)

(72) Inventors: Ravi Narasimhan, Los Altos, CA (US); Hemanth Sampath, Sunnyvale, CA (US); Hsiao-Cheng Tang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,167

(22) Filed: Nov. 5, 2012

Related U.S. Application Data

(63) Continuation of application No. 12/876,034, filed on Sep. 3, 2010, now Pat. No. 8,306,094, which is a continuation of application No. 12/179,830, filed on Jul. 25, 2008, now Pat. No. 7,796,681, which is a continuation of application No. 10/912,829, filed on Aug. 5, 2004, now Pat. No. 7,408,976.

(60) Provisional application No. 60/572,934, filed on May 19, 2004.

(51) Int. Cl.
  *H04B 17/00* (2006.01)
  *H04B 1/00* (2006.01)
(52) U.S. Cl.
  USPC ............................................ 375/226; 373/130

(58) Field of Classification Search
  USPC ......... 375/226, 130, 148, 229, 347, 348, 349; 455/100, 132
  See application file for complete search history.

(56) References Cited

U.S. PATENT DOCUMENTS

| 7,269,430 | B2 | 9/2007 | Moorti et al. |
| 7,463,577 | B2 | 12/2008 | Sudo et al. |
| 8,306,094 | B1 * | 11/2012 | Narasimhan et al. .......... 375/148 |
| 2004/0114675 | A1 * | 6/2004 | Crawford ...................... 375/149 |
| 2004/0136313 | A1 | 7/2004 | Goldstein et al. |
| 2005/0180312 | A1 | 8/2005 | Walton et al. |
| 2005/0195733 | A1 | 9/2005 | Walton et al. |
| 2006/0014494 | A1 | 1/2006 | Vanderperren et al. |
| 2006/0252386 | A1 | 11/2006 | Boer et al. |

OTHER PUBLICATIONS

IEEE Computer Society, "*Information Technology—Telecommunications and Information Exchange Between Systems—Local and Metropolitan Area Networks—Specific Requirements—Part 11: Wireless LAN Medium Access Control (MAC) and Physical Layer (PHY) Specifications*", IEEE Std 802.11—First Edition, 1999.

(Continued)

*Primary Examiner* — Khai Tran

(57) ABSTRACT

A device includes circuitry configured to receive orthogonal frequency-division multiplexing (OFDM) symbols of a training sequence, and circuitry configured to correlate training samples of the OFDM symbols to determine a frequency offset and configured to provide the determined frequency offset to perform frequency offset compensation for at least one multiple-in-multiple-out (MIMO)-OFDM frame to correct samples of training symbols in the at least one MIMO-OFDM frame. The correlated training samples correspond to a number of receive antennas through which the training sequence was received.

20 Claims, 8 Drawing Sheets

(56) References Cited

OTHER PUBLICATIONS

IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-speed Physical Layer in the 5 GHZ Band*", IEEE Std 802.11a—1999 (Supplement to IEEE Std 802.11—1999).

IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 GHZ Band*", IEEE Std 802.11b—1999 (Supplement to IEEE Std 802.11—1999).

IEEE Computer Society, "*IEEE Standard for Information Technology—DRAFT Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band*", IEEE P802.11g/D8.2, Apr. 2003.

IEEE Std 802.11a-1999(R2003), Part 11: Wireless LAN Medium Access Control (MAC) and Physical Layer (PHY) specifications, High-speed Physical Layer in the 5 GHZ Band, Jun. 12, 2003, pp. 7-8.

van Nee, Richard, A new OFDM standard for high rate wireless LAN in the 5 GHz band; Vehicular Technology Conference, 1999. VTC 1999—Fall. IEEE VTS $50^{th}$ vol. 1, Sep. 19-22, 1999 pp. 258-262 discloses a system with relevance to claims 1-60.

\* cited by examiner

MIMO-OFDM RECEIVER PROCESSING

CROSS-REFERENCE TO RELATED APPLICATIONS

This application is a continuation application of and claims the benefit of priority to U.S. patent application Ser. No. 12/876,034, filed Sep. 3, 2010, now U.S. Pat. No. 8,306,094, which is a continuation of and claims the benefit of priority to U.S. patent application Ser. No. 12/179,830, filed Jul. 25, 2008, now U.S. Pat. No. 7,796,681, which is a continuation of and claims the benefit of priority to U.S. patent application Ser. No. 10/912,829, filed Aug. 5, 2004, now U.S. Pat. No. 7,408,976, which claims the benefit of priority to U.S. Provisional Application Ser. No. 60/572,934, filed on May 19, 2004, the disclosure of each of which is incorporated herein by reference in its entirety.

BACKGROUND

Wireless phones, laptops, PDAs, base stations and other systems may wirelessly transmit and receive data. A single-in-single-out (SISO) system may have two single-antenna transceivers in which one predominantly transmits and the other predominantly receives. The transceivers may use multiple data rates depending on channel quality.

An $M_R \times M_T$ multiple-in-multiple-out (MIMO) wireless system uses multiple transmit antennas ($M_T$) and multiple receive antennas ($M_R$) to improve data rates and link quality. The MIMO system may achieve high data rates by using a transmission signaling scheme called "spatial multiplexing," where a data bit stream is demultiplexed into parallel independent data streams. The independent data streams are sent on different transmit antennas to obtain an increase in data rate according to the number of transmit antennas used. Alternatively, the MIMO system may improve link quality by using a transmission signaling scheme called "transmit diversity," where the same data stream (i.e., same signal) is sent on multiple transmit antennas after appropriate coding. The receiver receives multiple copies of the coded signal and processes the copies to obtain an estimate of the received data.

The number of independent data streams transmitted is referred to as the "multiplexing order" or spatial multiplexing rate ($r_s$). A spatial multiplexing rate of $r_s=1$ indicates pure diversity and a spatial multiplexing rate of $r_s=\min(M_R, M_T)$ (minimum number of receive or transmit antennas) indicates pure multiplexing.

DETAILED DESCRIPTION

Figure 1:
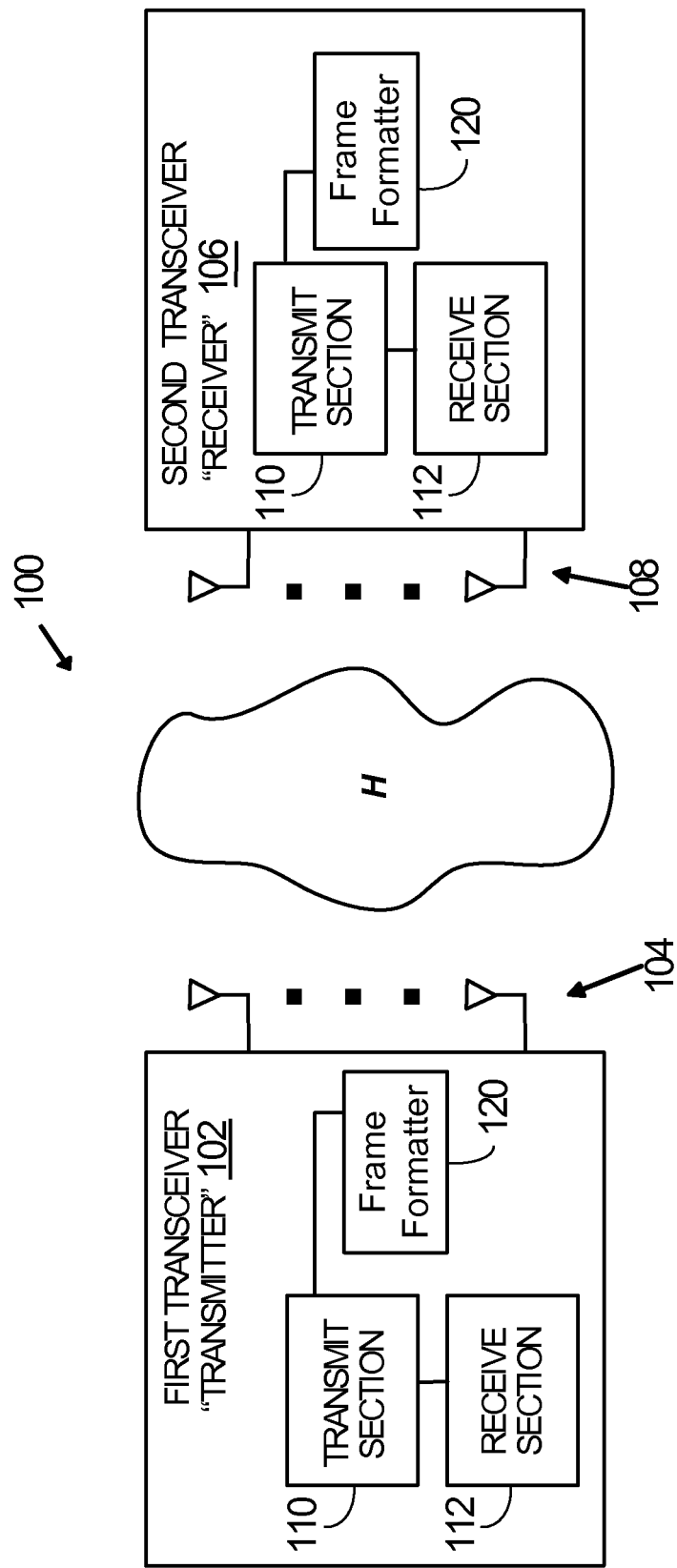
FIG. 1 is a block diagram of a wireless MIMO-OFDM communication system according to an embodiment.

FIG. 1 illustrates a wireless multiple-in-multiple-out (MIMO) communication system 100, which includes a first transceiver 102 with $M_T$ transmit ($T_X$) antennas 104 and a second transceiver 106 with $M_R$ receive (Rx) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data.

The transmitter 100 and receiver 102 may be implemented in a wireless local Area Network (WLAN) that complies with the IEEE 802.11 standards (including IEEE 802.11, 802.11a, 802.11b, 802.11g, and 802.11n). The IEEE 802.11 standards describe orthogonal frequency-division multiplexing (OFDM) systems and the protocols used by such systems. In an OFDM system, a data stream is split into multiple sub-streams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots 30, 31\}$, where 0 is the DC tone index. The DC tone is not used to transmit information.

The antennas in the transmitter 102 and receiver 106 communicate over channels in a wireless medium. In FIG. 1, H represents the reflections and multi-paths in the wireless medium, which may affect the quality of the channels. The system may perform channel estimation using known training sequences which are transmitted periodically (e.g., at the start of each frame). A training sequence may include one or more pilot symbols, i.e., OFDM symbols including only pilot information (which is known a priori at the receiver) on the tones. The pilot symbol(s) are inserted in front of each transmitted frame. The receiver 106 uses the known values to estimate the medium characteristics on each of the frequency tones used for data transmission. For example, on the receiver side, the signal $Y_k$ for tone k in an SISO system can be written as, $$Y_k = H_k X_k + N_k,$$

where $H_k$ is the channel gain for the k-th tone, $X_k$ is the symbol transmitted on the k-th tone, and $N_k$ is the additive noise. An estimate of the channel may be determined at the receiver by dividing $Y_k$ by $X_k$.

The number of independent data streams transmitted by the transmit antennas 104 is called the "multiplexing order" or "spatial multiplexing rate" ($r_S$). A spatial multiplexing rate of $r_S=1$ indicates pure diversity, and a spatial multiplexing rate of $r_s=\min(M_R, M_T)$ (minimum number of receive or transmit antennas) indicates pure multiplexing.

In an embodiment, the MIMO system 100 may use combinations of diversity and spatial multiplexing, e.g., $1 \le r_s \le \min(M_R, M_T)$. For example, in a 4×4 MIMO system, the system may select one of four available multiplexing rates ($r_s \in [1, 2, 3, 4]$) depending on the channel conditions. The system may change the spatial multiplexing rate as channel conditions change.

Figure 2:
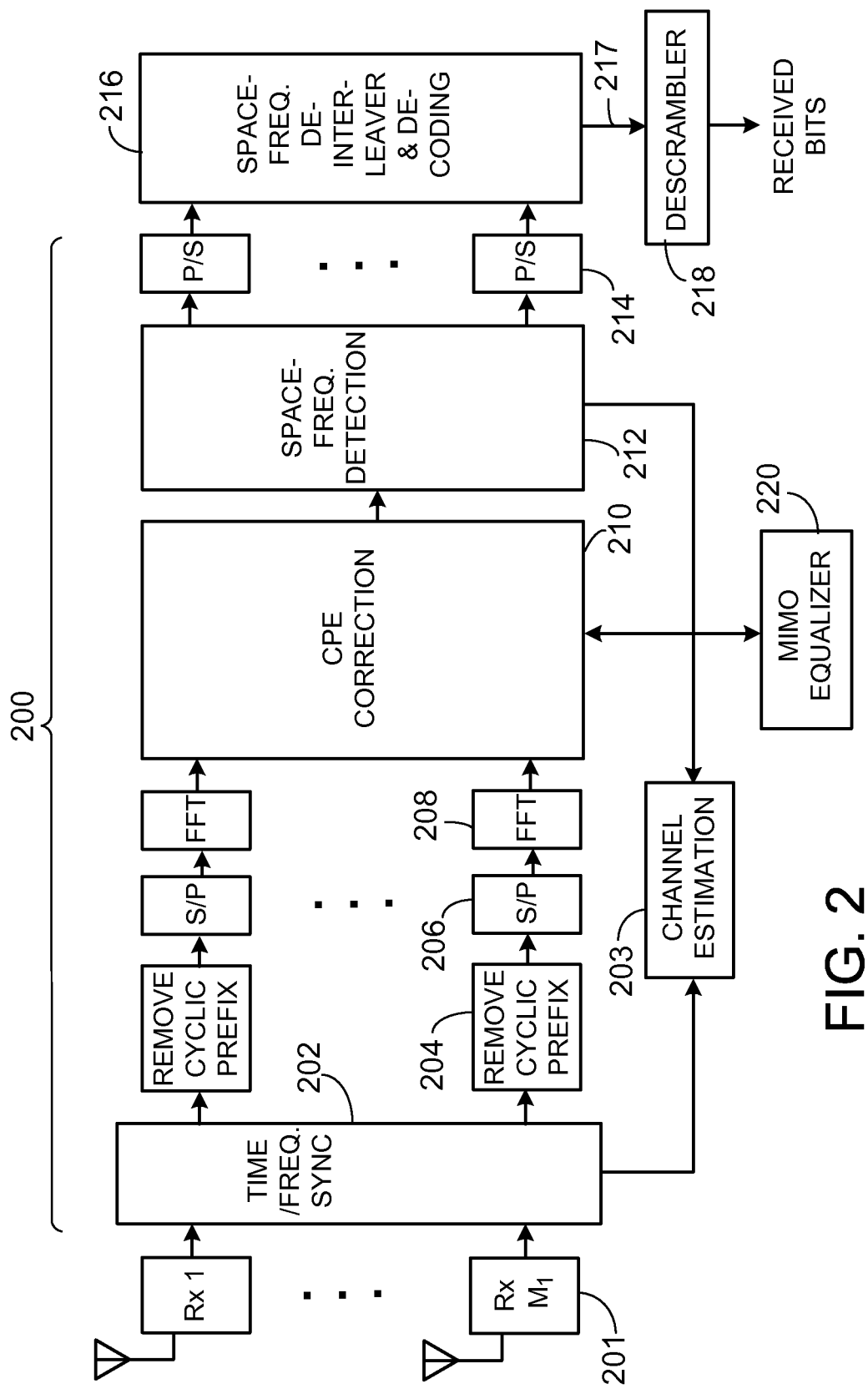
FIG. 2 is a block diagram of a receive section in a transceiver in the MIMO-OFDM communication system.

FIG. 2 shows a block diagram of the receive section 112. The receive section 112 includes stages similar to those in the receive section of an IEEE 802.11a receiver, but with some modifications to account for the multiple receive antennas.

Signals received on the multiple receive antennas are input to corresponding processing chains 200. Each processing chain includes a radio-frequency (RF) module 201 for RF-to-baseband and analog-to-digital (A/D) conversion. The receiver may have a common automatic gain control (AGC) for all antennas to provide minimal gain across all the receive antennas. A time/frequency synchronization module 202 performs synchronization operations and extracts information from the multiple substreams (for $r_S>1$) for channel estimation 203. Each processing chain 200 includes a cyclic prefix removal module 204, serial-to-parallel (S/P) converter 206, fast Fourier transform (FFT) module 208, a common phase error (CPE) correction module 210, a space-frequency detection module 212, and a parallel-to-serial (P/S) converter 214. The multiple substreams are input to a space-frequency deinterleaver and decoding module 216 which de-interleaves the substreams into a single data stream 217 and performs soft Viterbi decoding. The single stream is then input to a descrambler 218.

Figure 3:
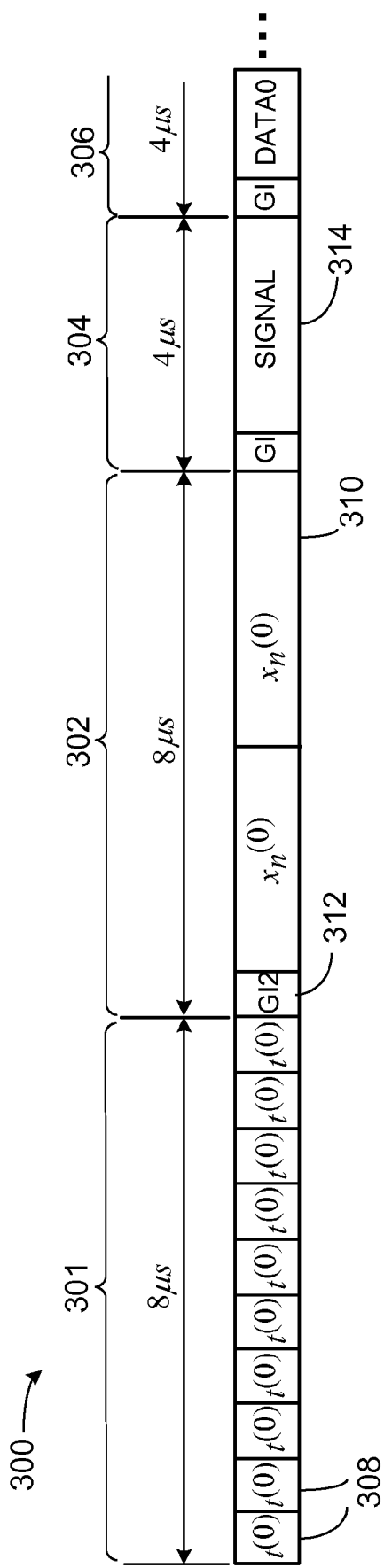
FIG. 3 illustrates an IEEE 802.11a frame format.

The MIMO-OFDM system may be compatible with IEEE 802.11a systems, and consequently may have many similarities to an IEEE 802.11a system. For example, like IEEE 802.11a systems, the MIMO-OFDM system may use 52 tones (48 data tones and 4 pilot tones), 312.5 kHz subcarrier spacing, an FFT/inverse FFT (IFFT) period of 3.2 μs, a cyclic prefix with a duration of 0.8 μs, and an OFDM symbol duration of 4.0 μs. The MIMO-OFDM system may also use a frame format 300 similar to that specified by IEEE 802.11a, which is shown in FIG. 3. In addition, variations of the MIMO-OFDM systems are also possible, including using different numbers of tones, different guard intervals, different forward error correction codes, and different constellations.

An IEEE 802.11a frame 300 includes a short preamble 301, a long preamble 302, a header 304, and a DATA field 306. The short preamble 302 includes of a short training symbol 308 with a duration of 0.8 μs repeated ten times. The short preamble may be used for signal detection, AGC, coarse frequency offset estimation, and symbol timing estimation.

The long preamble 302 includes two long training symbols 310, each of duration 3.2 μs, which are separated from the short training symbols 508 by a long guard interval (1.6 μs) 312. The long preamble is used for fine frequency offset estimation and channel estimation.

The header 304 includes a SIGNAL symbol 314, which is encoded at 6 Mbps. The SIGNAL symbol 314 is 12 bits in length and includes 4 bits for the data rate, 1 reserved bit, 1 parity bit, and 6 tail bits (set to "0" to return the convolutional decoder to State 0).

The DATA field 306 includes OFDM symbols including the data bits to be transmitted. The data bits are prepended by a 16-bit SERVICE field and are appended by 6 tail bits. The resulting bits are appended by a number of pad bits needed to yield an integer number of OFDM symbols.

Figure 4:
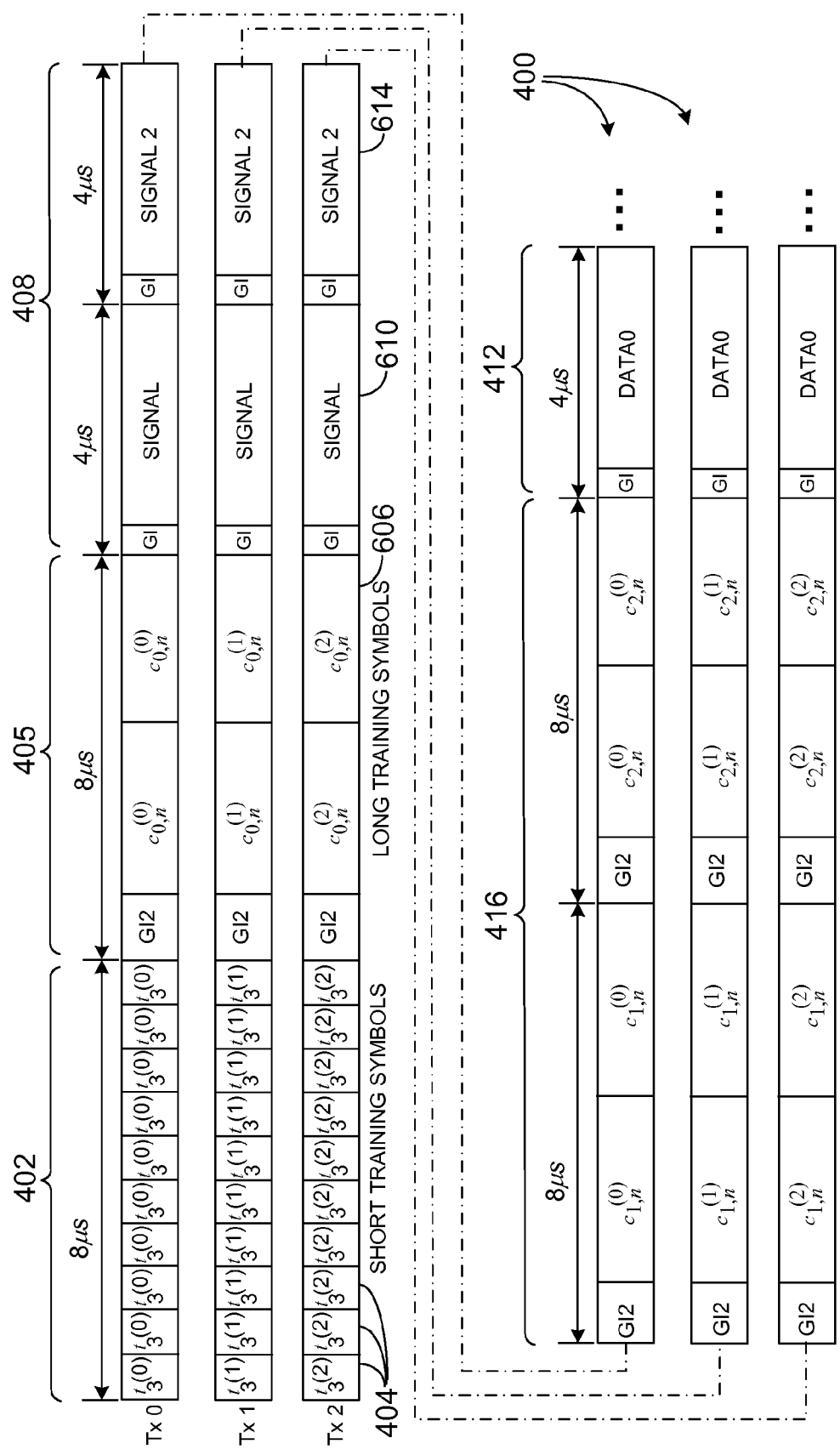
FIG. 4 illustrates a frame format for the MIMO-OFDM communication system.

The MIMO-OFDM system 100 may use a similar frame format 400, as shown in FIG. 4. The illustrated frame format 400 is for systems with three transmit antennas ($M_T=3$), but can be modified for other $M_T$. Each transmit antenna transmits a different MIMO-OFDM frame 400. Like the IEEE 802.11a frame 300, the MIMO-OFDM frames 400 include a short preamble 402 with a series of short training symbols 404, a long preamble 405 with a set of two long training symbols 406, a header 408 including a SIGNAL symbol 410, and a data field 412. In addition, the header 408 may include a second SIGNAL symbol (SIGNAL2) 414, which may be used to transmit MIMO-OFDM-specific information, such as the number of transmit antennas and the spatial multiplexing rate. The frame may also include a supplemental long preamble 416 including $M_T-1$ additional long training symbols to train the other antennas.

As in IEEE 802.11a, a short OFDM training symbol consists of 12 tones, which are modulated by the elements of the following frequency-domain sequence:

$$S_{-26,26} = \sqrt{\frac{13}{6}} \times \{0, 0, 1+j, 0, 0, 0, -1-j, 0, 0, 0, 1+j, 0, 0, 0, -1-j, 0, 0, 0,$$
$$-1-j, 0, 0, 0, 1+j, 0, 0, 0, 0, 0, 0, -1-j, 0, 0, 0, -1-j,$$
$$0, 0, 0, 1+j, 0, 0, 0, 1+j, 0, 0, 0, 1+j, 0, 0, 0, 1+j, 0, 0\}$$

The multiplication by $\sqrt{13/6}$ is in order to normalize the average power of the resulting OFDM symbol. The short training symbol has a duration of 0.8 μs and is repeated 10 times.

As in IEEE 802.11a, a long training OFDM symbol includes 52 tones, which are modulated by the following frequency-domain BPSK training sequence:

$$L_{-26,26}=\{1,1,-1,-1,1,1,-1,1,-1,1,1,1,1,1,1,-1,-1,1,1,-$$
$$1,1,-1,1,1,1,1,0,1,-1,-1,1,1,-1,1,-1,1,-1,1,-$$
$$1,-1,-1,1,1,-1,-1,1,-1,1,-1,1,1,1,1\}$$

The number of sets of long training symbols (or "long preambles") may be $M_T$ for all spatial multiplexing rates. The additional long training symbols may be used to estimate the full $M_R \times M_T$ channel matrix. This estimation may be used for link adaptation, in which modulation, coding rate, and/or other signal transmission parameters may be dynamically adapted to the changing channel conditions.

Figure 5A:
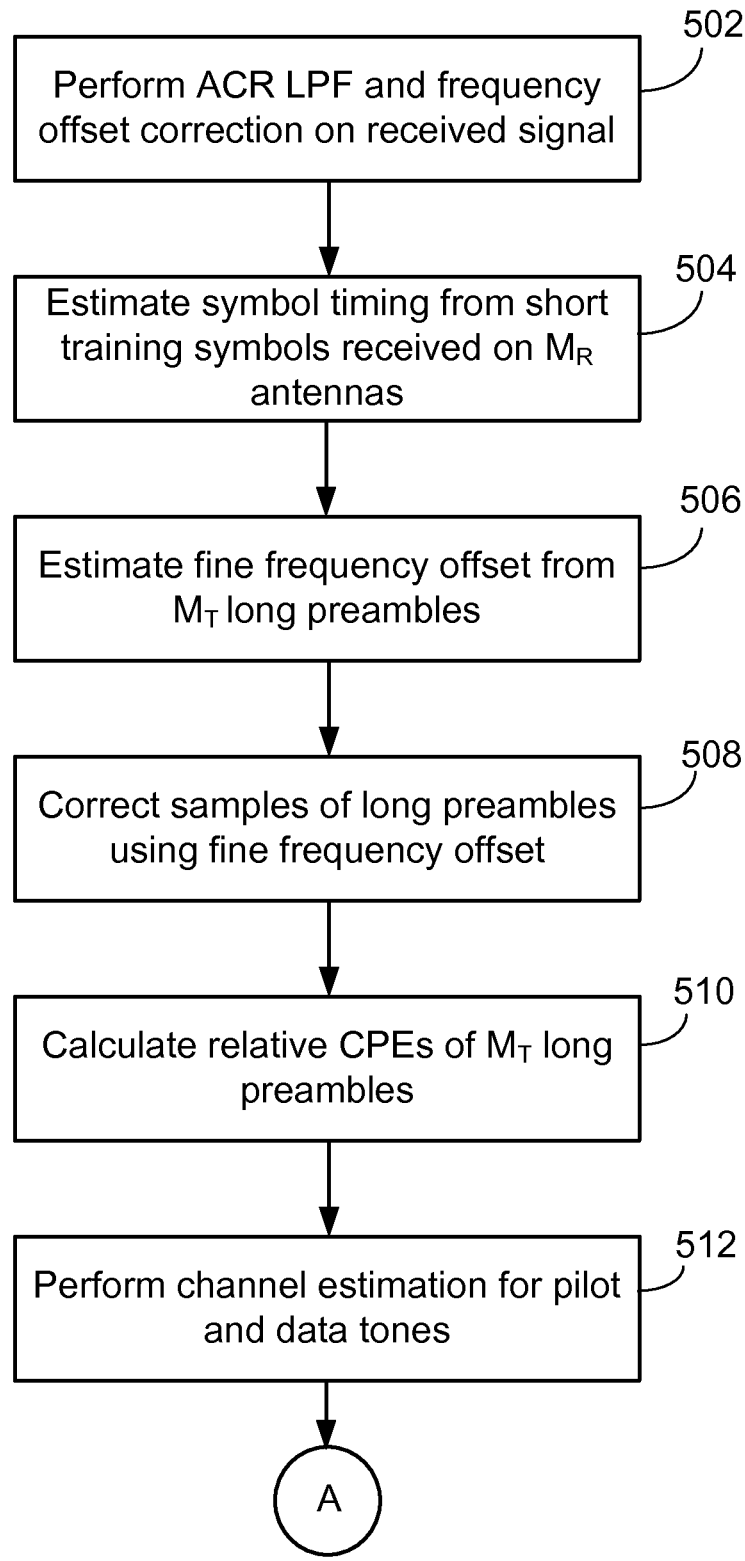
FIGS. 5A and 5B show a flowchart describing a MIMO-OFDM receiver processing operation according to an embodiment.
Figure 5B:
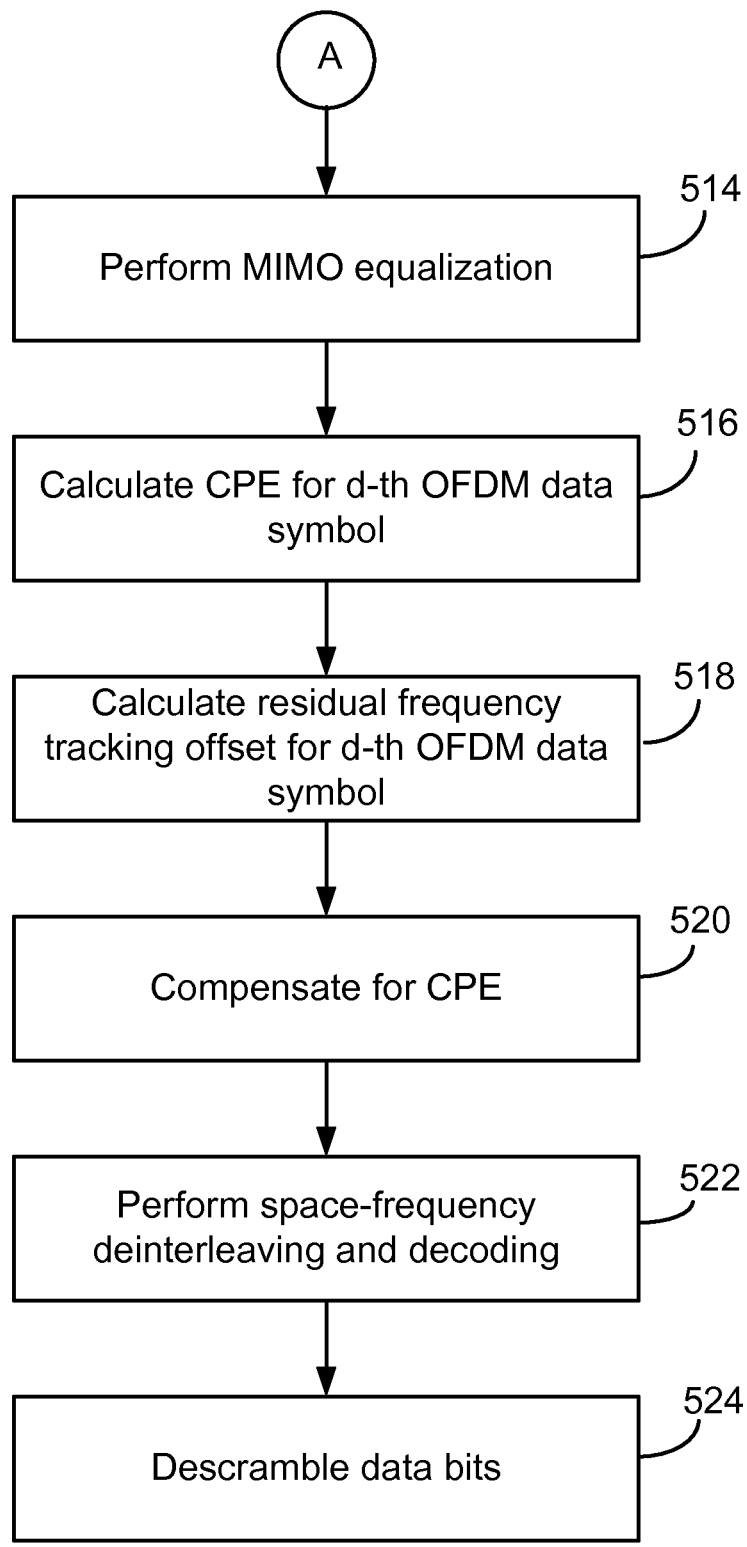
Figure 6:
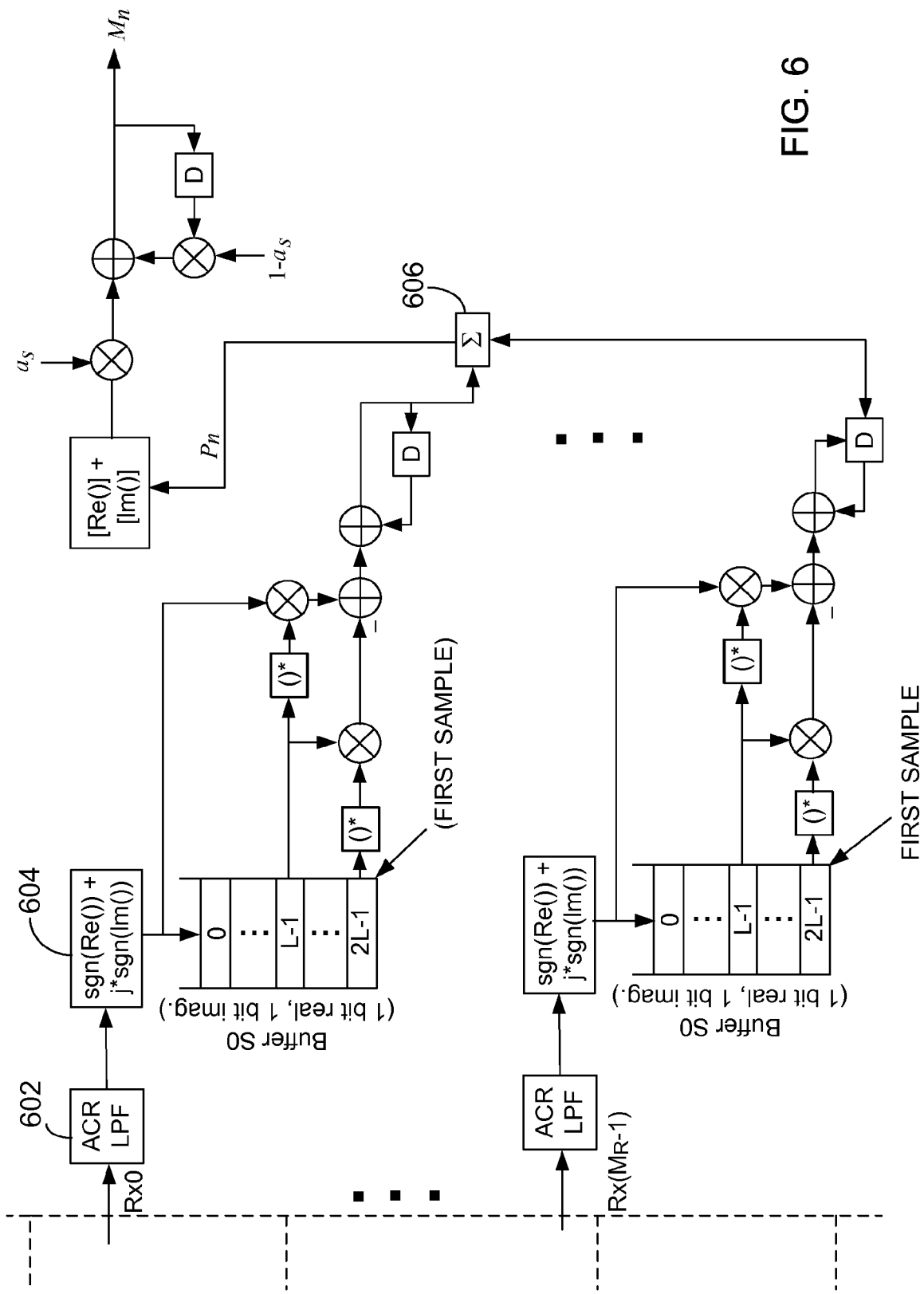
FIG. 6 is a block diagram of a portion of a time/frequency synchronization module in the receive section of the transceiver.

FIGS. 5A-5B show a flowchart describing a MIMO-OFDM signal processing operation 500 performed by the receiver 106. FIG. 6 shows a portion of the time/frequency synchronization module 202. The module 202 may perform adjacent channel rejection (ACR) and low pass filtering (LPF) operations (using ACR LPF module 602) and frequency offset correction on the received signals (block 502).

The time/frequency synchronization module 202 may use the short training symbols to estimate symbol timing (block 504). The received signal for the i-th receive antenna and n-th sample ($r_{i,n}$) may be used by a computation module 604 to generate a quantity $q_{i,n}$ using the following equation:

$$q_{i,n}=sgn[Re(r_{i,n})]+jsgn[Im(r_{i,n})].$$

The quantity $q_{i,n}$ calculated for each of the $M_R$ antennas may be used by a summing module 606 to generate a metric $P_n$ for the n-th sample using the following equation:

$$P_n = \sum_{i=0}^{M_R-1} \sum_{m=1}^{L} q^*_{i,n+m-2L} q_{i,n+m-L},$$

where L denotes the number of samples in one short training symbol. A value $M_n$ for the n-th sample may then be computed using the following equation:

$$M_n=(1-\alpha_s)M_{n-1}+\alpha_s(|Re(P_n)|+|Im(P_n)|),$$

where the parameter $\alpha_s$ may have a value in the range of $(0, \ldots, {}^{31}/_{64})$, e.g., $^{3}/_{32}$ for a 40 MHz analog-to-digital (A/D) conversion rate.

Figure 7:
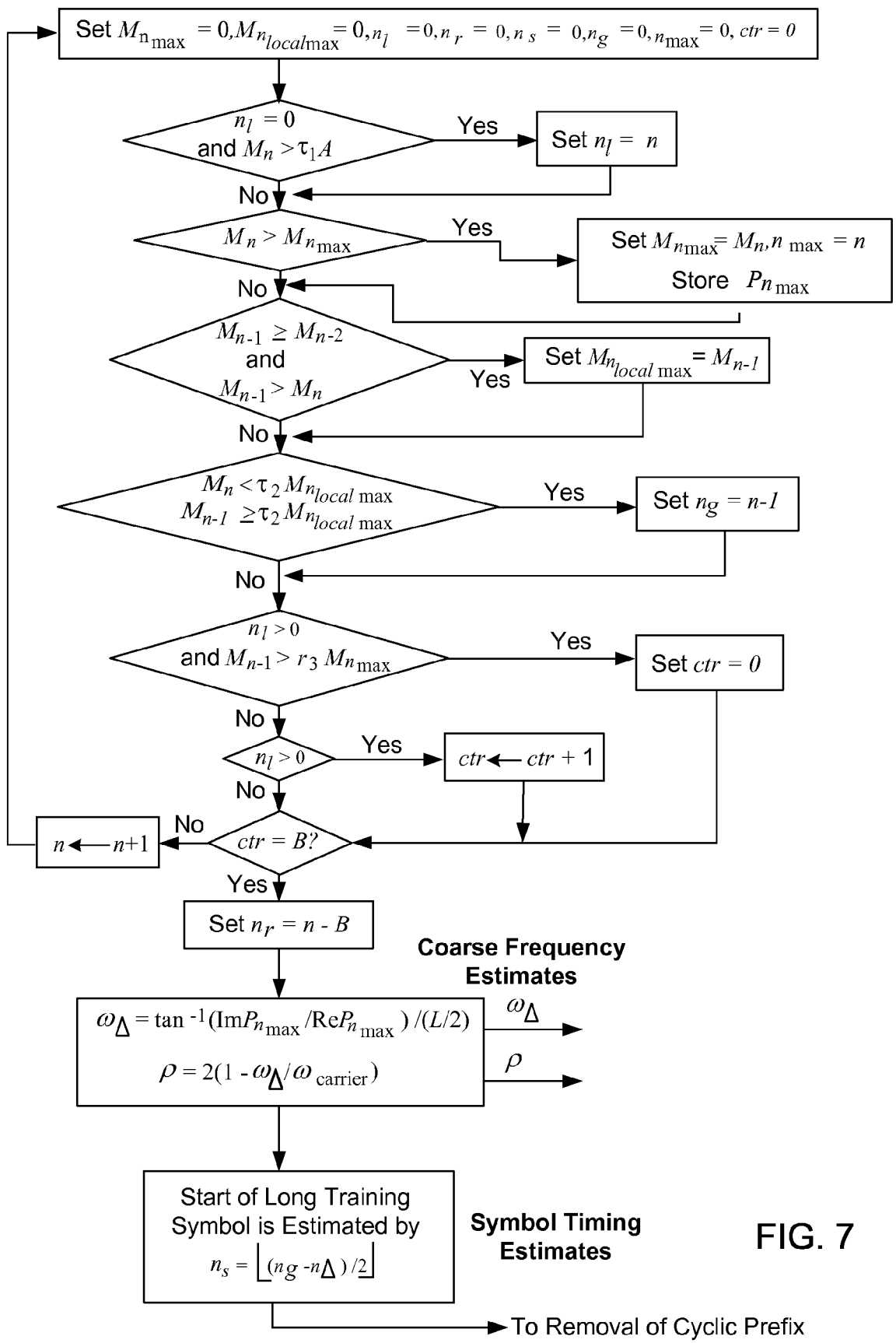
FIG. 7 is a flowchart describing a symbol timing estimation operation according to an embodiment.

The value $M_n$ may be used to estimate the symbol timing as in IEEE 802.11a, with the exception of using a more flexible threshold $\tau_3$ to check for $n_r$ (right endpoint of the plateau), as shown in FIG. 7. Typical parameter values for a 40 MHz analog-to-digital (A/D) conversion rate are given in Table 1.

TABLE 1

| Parameter | Exemplary value | Range |
|---|---|---|
| L | 32 | |
| $\tau_1$ | 0.375 | $(0, \ldots, 255/256)$ |
| A | $64 * M_R$ | |
| $\tau_2$ | 0.890625 | $(0, \ldots, 255/256)$ |
| $\tau_3$ | 0.5 | $(0, \ldots, 255/256)$ |
| B | 15 | $(0, \ldots, 63)$ |
| $n_D$ | 25 | $(0, \ldots, 63)$ |

The time/frequency synchronization module 202 may estimate the fine frequency offset (block 506) by correlating the received $M_R \times 1$ vectors from the two long training symbols in a long preamble using the following equation:

$$C = \sum_{i=0}^{M_R-1} \sum_{n=0}^{N-1} r_{i,n}^* r_{i,n+N},$$

where N is the FFT size. The angle of the correlation result ($\Delta \hat{f}$) may be used to estimate the fine frequency offset using the following equation:

$$\Delta \hat{f} = \frac{\arg(C)}{2\pi N T_s},$$

where $T_S$ is the sampling period at the FFT 208 output. The time/frequency synchronization module 202 may correct samples of long training symbols using the estimated fine frequency offset (block 508).

The channel estimation module 203 may perform channel estimation by averaging the corrected samples corresponding to the two long training symbols in a long preamble for all receive antennas 108. The channel estimation module 203 may compute the relative CPEs of the $M_T$ long preambles (block 510) using the following equation:

$$CPE_p = \frac{\sum_{k \in K_{pilots}} \sum_{i=0}^{M_R-1} R_{i,k}^{(0)*} R_{i,k}^{(p)}}{\sum_{k \in K_{pilots}} \sum_{i=0}^{M_R-1} |R_{i,k}^{(0)}|^2}, \quad p = 1, \ldots, M_T - 1,$$

where $CPE_0 = 1$, $R_{i,k}^{(p)}$ is the k-th FFT output for the i-th receive antenna and p-th preamble, and $K_{pilots}$ are the indices of the pilot tones. As in IEEE 802.11a, tones k=−21, −7, 7, and 21 are used for pilot tones in each data MIMO-OFDM symbol.

The channel estimation module 203 may generate channel estimates for the pilot tones and data tones using the frequency domain BPSK (Biphase Shifting Key) long training symbols ($L_k$) (block 512). For the data tones, the subcarrier channel estimates may be calculated using the following equation:

$$\hat{h}_{i,k}^{(p)} = R_{i,k}^{(p)} / (L_k CPE_p \sqrt{r_S}),$$

where $\hat{h}_{i,k}^{(p)}$ is the channel estimate for the k-th tone, i-th receive antenna, and p-th preamble. For the pilot tones, which are always sent on the same tone, the subcarrier channel estimates may be calculated using the following equation:

$$\hat{h}_{i,k}^{(0)} = R_{i,k}^{(0)} / L_k.$$

An equalizer 220 may perform MIMO equalization (block 514) by forming an $M_R \times r_S$ effective channel matrix for data tone k:

$$\hat{H}_k = \begin{bmatrix} \hat{h}_{0,k}^{(0)} & \cdots & \hat{h}_{0,k}^{(r_S-1)} \\ \vdots & \ddots & \vdots \\ \hat{h}_{M_R-1,k}^{(0)} & \cdots & \hat{h}_{M_R-1,k}^{(r_S-1)} \end{bmatrix}.$$

The equalizer 220 may use a zero forcing equalizer per tone:

$$G_k = (\hat{H}_k^* \hat{H}_k)^{-1} \hat{H}_k^*.$$

The equalizer 220 may then compute a bit-metric weight for the l-th substream, which equals the normalized post-processing signal-to-noise ratio (SNR) of the l-th substream:

$$W_{l,k} = \frac{1}{[(\hat{H}_k^* \hat{H}_k)^{-1}]_{l,l}},$$

where l,l represents the diagonal element.

The CPE correction module 210 may generate a scalar CPE estimate for the d-th data symbol (block 518) using the following equation:

$$CPE^{(d)} = \frac{\sum_{k \in K_{pilots}} \sum_{i=0}^{M_R-1} P_k \hat{h}_{i,k}^{(0)*} Y_{i,k}^{(d)}}{\sum_{k \in K_{pilots}} \sum_{i=0}^{M_R-1} |\hat{h}_{i,k}^{(0)}|^2},$$

where $Y_{i,k}^{(p)}$ is the k-th output for the i-th receive antenna and d-th data symbol, and $P_k \in \{1, -1\}$ is the BPSK pilot symbol for tone k.

Using this CPE value, the CPE correction module 210 can determine the residual frequency offset tracking for the d-th OFDM data symbol ($\Delta \hat{f}^{(d)}$) (block 518) using the following equation:

$$\Delta \hat{f}^{(d)} = \Delta \hat{f}^{(d-1)} + \beta Im[CPE^{(d)}].$$

The space-frequency detection module 212 may generate the k-th output for the d-th data symbol by concatenating the corresponding outputs of the $M_R$ receive antennas:

$$Y_k^{(d)} = [Y_{0,k}^{(d)} Y_{1,k}^{(d)} \ldots Y_{M_R-1,k}^{(d)}]^T.$$

The space-frequency detection module 212 may then form an equalized signal for data tone k using the zero forcing equalizer for the tone ($G_k$):

$$\tilde{X}_k^{(d)} = G_k Y_k^{(d)}.$$

The space-frequency detection module 212 may then compensate for CPE (block 520) using the following equations:

$$\hat{X}_k^{(d)} = \tilde{X}_k^{(d)} / CPE^{(d)};$$

$$\hat{W}_{l,k} = |CPE^{(d)}|^2 W_{l,k}.$$

The CPE compensated weight value for the l-th substream ($\hat{W}_{l,k}$) may be used to obtain log-likelihood ratios (LLRs) for soft Viterbi decoding. As in IEEE 802.11a, the space-frequency deinterleaving and decoding module 216 may concatenate LLRs for each substream into a single sequence, deinterleave the LLR sequence, and decode data bits using soft Viterbi decoding (block 522). The descrambler may then descramble data bits using scrambler state estimation obtained from the SERVICE field (block 524).

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A device comprising:
    circuitry configured to receive orthogonal frequency-division multiplexing (OFDM) symbols of a training sequence; and
    circuitry configured to correlate training samples of the OFDM symbols to determine a frequency offset, wherein the correlated training samples correspond to a number of receive antennas through which the training sequence was received, and configured to provide the determined frequency offset to perform frequency offset compensation for at least one multiple-in-multiple-out (MIMO)-OFDM frame to correct samples of training symbols in the at least one MIMO-OFDM frame.

2. The device of claim 1, wherein the circuitry configured to correlate the training samples and provide the determined frequency offset comprises a time/frequency synchronization module configured to estimate symbol timing using additional samples different from the samples of the OFDM symbols.

3. The device of claim 2, wherein the circuitry configured to correlate the training samples and provide the determined frequency offset comprises circuitry configured to estimate the frequency offset using an angle of a correlation result.

4. The device of claim 3, comprising circuitry configured to generate an effective channel matrix.

5. The device of claim 1, comprising:
    circuitry configured to calculate a fast Fourier transform value for each of the receive antennas; and
    circuitry configured to determine a relative common phase error value for each of a plurality of long preambles in the at least one MIMO-OFDM frame using the fast Fourier transform values.

6. The device of claim 5, comprising circuitry configured to generate subcarrier channel estimates for data tones using the relative common phase error values.

7. The device of claim 6, comprising circuitry configured to generate a channel matrix for a data tone, and configured to generate an equalizer value based on the channel matrix.

8. The device of claim 7, comprising:
    circuitry configured to generate a zero forcing equalizer value for the data tone from the channel matrix; and
    circuitry configured to generate an equalized signal for the data tone based on an output of each of the receive antennas and the zero forcing equalizer value.

9. The device of claim 5, comprising circuitry configured to generate a scalar common phase error estimate for a data symbol, and configured to determine residual frequency offset tracking for the data symbol using the scalar common phase error estimate for the data symbol.

10. The device of claim 9, comprising circuitry configured to generate an output for the data symbol by concatenating corresponding outputs of the receive antennas, and configured to compensate for common phase error in the generated output using the scalar common phase error estimate for the data symbol.

11. A method comprising:
    receiving orthogonal frequency-division multiplexing (OFDM) symbols of a training sequence;
    correlating training samples of the OFDM symbols to determine a frequency offset, wherein the correlated training samples correspond to a number of receive antennas through which the training sequence was received; and
    providing the determined frequency offset to perform frequency offset compensation for at least one multiple-in-multiple-out (MIMO)-OFDM frame to correct samples of training symbols in the at least one MIMO-OFDM frame.

12. The method of claim 11, comprising estimating symbol timing using additional samples different from the samples of the OFDM symbols.

13. The method of claim 12, comprising estimating the frequency offset using an angle of a correlation result from the correlating.

14. The method of claim 13, comprising generating an effective channel matrix.

15. The method of claim 11, comprising:
    calculating a fast Fourier transform value for each of the receive antennas; and
    determining a relative common phase error value for each of a plurality of long preambles in the at least one MIMO-OFDM frame using the fast Fourier transform values.

16. The method of claim 15, comprising generating subcarrier channel estimates for data tones using the relative common phase error values.

17. The method of claim 16, comprising:
    generating a channel matrix for a data tone; and
    generating an equalizer value based on the channel matrix.

18. The method of claim 17, comprising:
    generating a zero forcing equalizer value for the data tone from the channel matrix;
    generating an equalized signal for the data tone based on an output of each of the receive antennas and the zero forcing equalizer value.

19. The method of claim 15, comprising:
    generating a scalar common phase error estimate for a data symbol; and
    determining residual frequency offset tracking for the data symbol using the scalar common phase error estimate for the data symbol.

20. The method of claim 19, comprising:
    generating an output for the data symbol by concatenating corresponding outputs of the receive antennas; and
    compensating for common phase error in the generated output using the scalar common phase error estimate for the data symbol.

* * * * *